C. M. RUNYAN, DEC'D.
D. T. RUNYAN, ADMINISTRATRIX.
FENDER FOR MOTOR CARS.
APPLICATION FILED MAR. 30, 1916. RENEWED AUG. 13, 1920.
1,354,441. Patented Sept. 28, 1920.
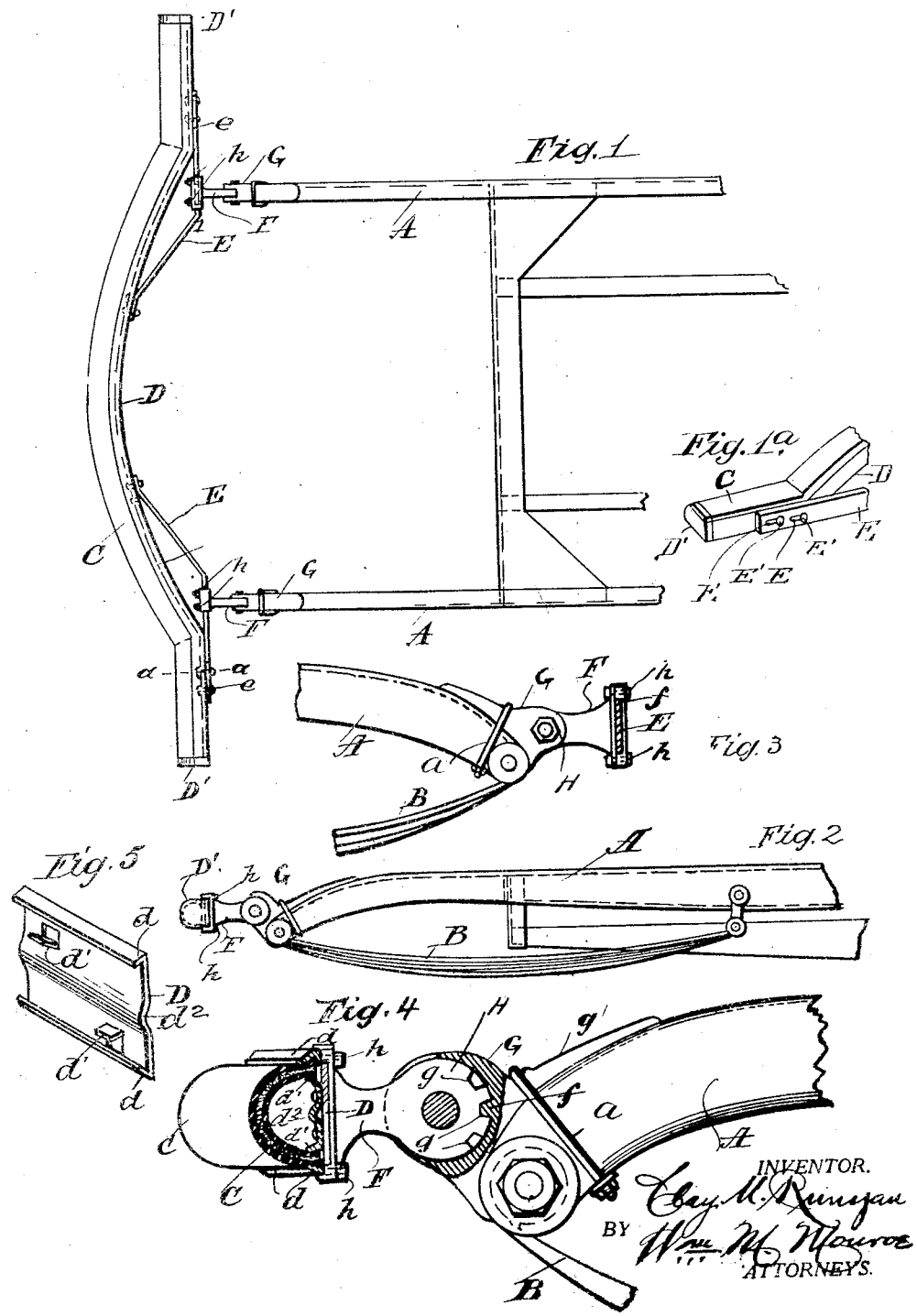

UNITED STATES PATENT OFFICE.

CLAY M. RUNYAN, OF LAKEWOOD, OHIO, BY DOROTHY T. RUNYAN, OF CLEVELAND, OHIO, ADMINISTRATRIX OF CLAY M. RUNYAN, DECEASED.

FENDER FOR MOTOR-CARS.

1,354,441.  Specification of Letters Patent.  Patented Sept. 28, 1920.

Application filed March 30, 1916, Serial No. 87,764. Renewed August 13, 1920. Serial No. 403,303.

*To all whom it may concern:*

Be it known that I, CLAY M. RUNYAN, a citizen of the United States, and resident of Lakewood, in the county of Cuyahoga and State of Ohio, have invented certain new and useful Improvements in Fenders for Motor-Cars, of which I hereby declare the following to be a full, clear, and exact description, such as will enable others skilled in the art to which it appertains to make and use the same.

The objects of the invention are to provide a simple and efficient and resilient form of bumper or fender for motor driven vehicles and adjustable means for detachably securing the same to the frame of the car.

The invention comprises an elongated resilient member constituting a preliminary shock absorbing member positioned transversely of the car and in front or rear of the same. It also includes a back support or bar for the resilient member and also supporting bracket bars connecting the supporting back with the front extremities of the frame of the car. These bracket bars are designed to absorb the remaining shock after the preliminary action of the transverse resilient member.

It includes jointed attaching means for the bars permitting of vertical adjustment of the fender, and also permitting transverse movement of the attaching means to make them conveniently adjustable to the size of the vehicle.

The invention comprises also the combination and arrangement of parts and details of construction hereinafter described, shown in the accompanying drawings and specifically pointed out in the claims.

In the accompanying drawings Figure 1 is a plan view of the device in assembled position; Fig. 1ª shows the inner face of the rigid back piece and of the slotted bracket bar; Fig. 2 is a side elevation thereof; Fig. 3 is an enlarged side elevation of the bracket: Fig. 4 is an enlarged transverse section of the bracket and of the bumper on line *a—a* Fig. 1; Fig. 5 is a perspective view of the back piece of the fender.

In these views, A, A, are the side bars of the frame of the machine, B, B, the front springs therefor. C is the bumper or fender which is preferably composed of one-half of a longitudinally divided rubber hose or other resilient material secured by dovetailing or otherwise upon the rigid back piece D serving as a buffer bar therefor. This fender comprises an arched member C substantially semi-circular or arc shaped in cross-section, providing relatively rigid sides and a yielding center. The sides therefore sustain a strong lateral thrust, and are much more rigid than if the hose were entire or circular in cross-section. The ridge $d^2$ extends outwardly and reinforces the back piece D and also receives the impact of the crown of the member C if it should be crushed down by an unusually severe shock.

The inwardly bent edges $d$, $d$, of the rigid back piece D form a dovetail recess in which the half hose is securely retained in place and serve as keepers to prevent it from spreading laterally and also provide stiffening flanges to prevent the back piece from becoming bent out of shape.

Spaced lugs or keepers $d'$, $d'$ extending inwardly from the back piece assist the flanges $d$, $d$, in clamping the edges of the hose so as to retain it firmly in place. Caps D' D' upon the open extremities of the rigid back piece D and bumper C prevent the entrance of water and dust into the shock receiving bumper member C which might destroy its efficiency.

One or more longitudinal corrugations $d^2$ also strongly reinforce the back piece.

These portions form the fender which is positioned transversely of the machine and is supported resiliently by means of spring bars E, E, at each end of the bar D. These bars are preferably slotted at $e$, $e$, to permit freedom of movement thereof upon bolts E', E'.

To these bars a plurality of supporting members are attached. Each member is composed of portions F and G which are adjustably secured together by means of a bolt H passing therethrough. The member G is secured to the frame at $g'$. The member F is provided with a circular disk shaped head having spaced recesses $g$ therein and a narrow neck, and the other member is provided with a complementary socket having a tooth $f$ in its inner edge.

Before inserting the bolt the disk shaped head F is rotated until the fender is placed at the desired elevation. The part F is then inserted in the socket member until the tooth $f$ engages with one of the spaced recesses $g$.

The bolt or pin H is then inserted through both members until they are rigidly secured together.

Each inner member G of the jointed members is provided with a tongue or extension g' adapted to overlap the side bar A and clamping bolts a a, secure it thereto, or may be shaped to be attached to any desired portion of the vehicle.

This construction permits all vertical and transverse adjustment of the bumper necessary. Furthermore, the construction of the resilient portion of the front of the bumper from half hose provides all the required resiliency with a greater amount of strength and durability than could be obtained from the use of an entire hose.

In Fig. 5 the corrugation or raised portion $d^2$ of the back bar is spaced from the crown of the shock receiving member C, and sustains the direct pressure of the shock after the collapse of the outer member.

Having described the invention what I claim as new and desire to secure by Letters Patent is:

1. The combination with the frame of a vehicle, of a fender therefor, said fender comprising, a buffer bar having forwardly extending inclined flanges at its longitudinal edges, and integral outwardly extending lugs, intermediate of and spaced from said side flanges, said bar having a forwardly projected reinforcing member intermediate of its longitudinal edges, and a hollow arched resilient member having its longitudinal edges inserted between the said marginal flanges and intermediate lugs on said bar, and means for securing said bar to said vehicle frame.

2. In a fender for a vehicle having a frame, a transversely positioned buffer bar, a resilient member secured to the front face thereof, said resilient member comprising an arched piece of longitudinally divided hose semi-circular in cross section and having a resilient crown and relatively rigid sides forming thrust members, marginal and intermediate keepers upon said bar for the longitudinal edges of said hose, and means for securing the said fender to the vehicle frame.

3. In a fender for a vehicle having a frame, a transversely positioned bar, a resilient member secured to the front face thereof, said resilient member comprising, a piece of longitudinally divided hose, arc shaped in cross section, and having a resilient crown and relatively rigid sides forming thrust members, and relatively rigid keepers upon the longitudinal edges of said bar engaging the outer edges of said resilient member, and integral keepers spaced from the marginal keepers and from each other for engaging the inner edges of said resilient member, and means for attaching said bar to the vehicle frame.

In testimony whereof I hereunto set my hand this 28th day of March 1916.

CLAY M. RUNYAN.

In presence of—
  WM. J. KLOTZBACH,
  WM. M. MONROE.